US010838822B2

(12) United States Patent
Pidduck et al.

(10) Patent No.: US 10,838,822 B2
(45) Date of Patent: Nov. 17, 2020

(54) SYSTEMS AND METHODS FOR CONTENT SERVER MAKE DISK IMAGE OPERATION

(71) Applicant: Open Text SA ULC, Halifax (CA)

(72) Inventors: Patrick Thomas Sidney Pidduck, Waterloo (CA); Laura Hélène Boyd, Kitchener (CA)

(73) Assignee: OPEN TEXT SA ULC, Halifax (CA)

( * ) Notice: Subject to any disclaimer, the term of this patent is extended or adjusted under 35 U.S.C. 154(b) by 297 days.

(21) Appl. No.: 16/040,823

(22) Filed: Jul. 20, 2018

(65) Prior Publication Data

US 2018/0329784 A1 Nov. 15, 2018

Related U.S. Application Data

(63) Continuation of application No. 15/173,913, filed on Jun. 6, 2016, now Pat. No. 10,055,301.

(60) Provisional application No. 62/175,694, filed on Jun. 15, 2015.

(51) Int. Cl.
*G06F 11/14* (2006.01)
*G06F 16/93* (2019.01)

(52) U.S. Cl.
CPC ...... *G06F 11/1451* (2013.01); *G06F 11/1464* (2013.01); *G06F 16/93* (2019.01); *G06F 2201/80* (2013.01)

(58) Field of Classification Search
CPC .. G06F 11/1451; G06F 11/1464; G06F 16/93; G06F 2201/80
USPC .......................................... 707/645
See application file for complete search history.

(56) References Cited

U.S. PATENT DOCUMENTS

| 5,794,052 A | * | 8/1998 | Harding | G06F 9/454 |
| | | | | 717/178 |
| 5,842,024 A | * | 11/1998 | Choye | G06F 8/61 |
| | | | | 717/178 |
| 7,945,751 B2 | | 5/2011 | Garapati et al. | |
| 8,327,096 B2 | | 12/2012 | Silvera et al. | |
| 8,612,393 B2 | | 12/2013 | Huang et al. | |
| 9,087,040 B2 | | 7/2015 | Tobin et al. | |
| 9,280,336 B2 | | 3/2016 | Poddar et al. | |
| 9,311,326 B2 | * | 4/2016 | Goyen | G06F 16/178 |

(Continued)

OTHER PUBLICATIONS

Bombich Software, Backing Up to a Disk Image, Carbon Copy Cloner, Jun. 10, 2016, <<https://bombich.com/kb/ccc4/backing-up-disk-image>>, 4 pages.

(Continued)

*Primary Examiner* — Robert Stevens
(74) *Attorney, Agent, or Firm* — Sprinkle IP Law Group

(57) ABSTRACT

Responsive to a request from a user device, a content server may perform an electronic discovery function. The request may include information on a quantity of data objects desired from a collection of data objects stored in a repository. Objects stored in the repository may be managed by the content server. The content server may determine a number of batches and process the collection of data objects into batches, each having a batch size. An efficient selection process may be determined and utilized in selecting data objects from each of the batches such that a total number of data objects selected from the collection is not less than the quantity of data objects desired. The content server may make a disk image of the selected data objects and communicate same to the user device over a network.

20 Claims, 5 Drawing Sheets

(56) References Cited

U.S. PATENT DOCUMENTS

| | | |
|---|---|---|
| 10,055,301 B2 | 8/2018 | Pidduck et al. |
| 2004/0049668 A1 | 3/2004 | Miyamoto et al. |
| 2005/0283456 A1 | 12/2005 | Graham et al. |
| 2008/0052349 A1* | 2/2008 | Lin .................. H04N 1/2187 709/203 |
| 2011/0119348 A1 | 5/2011 | Gibbons |
| 2015/0254080 A1 | 9/2015 | Zhang et al. |
| 2015/0254089 A1 | 9/2015 | Siegman et al. |
| 2016/0147558 A1 | 5/2016 | Gaponenko et al. |
| 2016/0364299 A1 | 12/2016 | Pidduck et al. |

OTHER PUBLICATIONS

Luoma et al., Qualcomm v. Broadcom: Implications for Electronic Discovery, Proceedings of the 7th Australian Digital Forensics Conference, Dec. 3, 2009, Perth, Australia, 9 pages.

Notice of Allowance issued for U.S. Appl. No. 15/173,913, dated Apr. 19, 2018, 10 pages.

Khanna et al., Task Scheduling and File Replication for Data-Intensive Jobs with Batch-Shared I/O, Proceedings of the 15th IEEE International Symposium on High Performance Distributed Computing, HPDC 2006, IEEE, Jun. 19-23, 2006, pp. 241-252.

Gamage et al., vPipe: Piped I/O Offloading for Efficient Data Movement in Virtualized Clouds, Proceedings of the ACM Symposium on Cloud Computing, SOCC '14, ACM, Nov. 3-5, 2014, 13 pages.

\* cited by examiner

SYSTEMS AND METHODS FOR CONTENT SERVER MAKE DISK IMAGE OPERATION

CROSS REFERENCE TO RELATED APPLICATIONS

This patent application is a continuation of and claims a benefit of priority under 35 U.S.C. § 120 from U.S. patent application Ser. No. 15/173,913, filed Jun. 6, 2016, entitled "SYSTEMS AND METHODS FOR CONTENT SERVER MAKE DISK IMAGE OPERATION," which claims a benefit of priority under 35 U.S.C. § 119(e) from, U.S. Provisional Application No. 62/175,694, filed Jun. 15, 2015. All applications referenced in this paragraph are fully incorporated by reference herein for all purposes.

TECHNICAL FIELD

This disclosure relates generally to electronic discovery. More particularly, this disclosure relates to a "make disk image" server operation.

BACKGROUND OF THE RELATED ART

Electronic discovery (also known as e-discovery or eDiscovery) refers to the process of identifying, or discovering data and/or electronic documents in a custodian's data stores which contain information relevant to a legal or administrative proceeding and for which there is a reason (often times a legal obligation) to make available to third parties, such as attorneys, courts, or service bureaus. Such electronic information is subject to local rules and agreed-upon processes, and is often reviewed for privilege and relevance before being turned over to opposing counsel.

In an electronic discovery workflow, potentially responsive documents are first searched and identified, typically with one or more commercially available e-discovery software tools, for further analysis and review. These may include e-mails, electronic texts, spreadsheets and other species of data in a custodian's stores that contain information that the custodian has a reason, such as a legal obligation, to provide or produce to another party in litigation or similar context. The identified documents are then placed in a legal hold to prevent them from getting destroyed. Once the potentially responsive documents are preserved, collection can begin. Collection refers to the transfer of data from a company to their legal counsel. Some companies may have electronic discovery software tools in place so that legal holds may be placed and collection may begin right away if necessary. Ordinarily, once collection(s) satisfying search criteria are generated, the documents and data are reviewed by humans to determine the extent, if any, to which the documents contain the information sought.

Such an electronic discovery software tool allows a user to identify potentially responsive documents by searching data storages for data matching criteria believed to be associated with documents or data containing potentially relevant or responsive information and adding it to a data or document collection. The user may then use the electronic discovery software tool to create a disk image of the collection and hand it over to the attorney(s) for review. As can be appreciated, such an electronic discovery process can be expensive, in that tens of thousands or more of documents, emails, etc., may be required to be found and copied. In some cases, such a disk image may comprise hundreds of data disks and present difficulties for "burning" as well as delivery by virtue of its size. In such cases where the disk image is very large, the electronic discovery process may become even more inefficient and/or expensive, as determining whether the documents and data in such a large collection is nonresponsive and another search and disk image is required may involve many man-hours of human follow-on review.

The term "disk image" is used here given the historical need to create physical disks, CDs, DVDs or tapes. In practice, this term may also encompass one or more large data sets or ZIP images that can be transmitted electronically.

Some electronic discovery software tools may allow a user to export a sample of documents in a collection and "test" it (e.g., by sending the sample documents to the attorney(s) for review) to see if the documents collected in the sample may be deemed relevant. If so, the entire collection may be produced. However, such methods necessitate a tradeoff between accuracy and performance. Furthermore, in general, by examining an entirety of a data set at a time, such methods are relatively slow, which can incentivize the user to value speed of performance more than accuracy, which may result in having to go back and assemble a new disk image, again raising costs.

SUMMARY OF THE DISCLOSURE

In many cases, a collection of documents identified by a conventional electronic discovery tool may be extremely voluminous and/or not necessarily contain information relevant to the litigation. In such cases, human review of the collection for relevancy may impose significant burdens on a custodian in terms of the cost of review and time spent reviewing a corpus of entirely irrelevant documents.

Furthermore, the relevancy of a collection of documents identified by a conventional electronic discovery tool is often limited by the very nature of electronic discovery tools in general—they are special software particularly configured for search and discovery applications. Because they are not content servers, conventional electronic discovery tools can be inefficient, ineffective, inaccurate, and limited in capacity and functionality when compared to powerful content management systems. However, while content servers are complex, powerful systems, they typically are not configured to perform special electronic discovery operations such as a make disk image operation.

An object of this disclosure is to provide a content server with built-in, high performance electronic discovery functionality. This and other objects can be achieved through systems, methods and computer program products disclosed herein that provide a mechanism for a content server to perform an electronic discovery workflow. In some embodiments, the electronic discovery workflow may include a make disk image operation which generates a disk image of data. The disk image thus generated by the content server contains a number of data items that, to a degree of statistical significance, is representative of a collection of data stored in a repository.

With built-in, high performance electronic discovery functionality, the content server can identify and create a smaller, but still representative, set of documents that can be reviewed for responsiveness. More particularly, in some embodiments, a content server with built-in electronic discovery functionality may receive a number of documents to be produced in a make disk image operation and divide a document collection into a number of batches. The content server may then select a corresponding statistically representative number of documents from each of the batches.

More specifically, in accordance with embodiments, a content server embodied on one or more server machines may receive from a user device a request to perform a disk image generation operation (e.g., a "Make Disk Image" or MDI operation). The request may include an amount indicating a quantity of documents desired from a collection of documents stored in a repository. The repository may be managed by the content server.

In some embodiments, the content server uses a batch size to determine a number of batches for processing the collection of documents. The content server may divide the collection of documents into batches of the batch size corresponding to the number. To do so, the content server may select documents from each of the batches to form a set of selected documents. The set of selected documents may equal or approximately equal to the quantity of documents desired from the collection of documents stored in the repository. Finally, the content server may generate a disk image containing the set of documents selected by the content server from each of the batches to represent the collection of documents stored in the repository.

In generating the disk image, the content server may determine a total of documents to be selected from each of the batches such that the number of documents is met. In some embodiments, the content server may determine the batch size relative to the quantity of documents desired from the collection of documents at a desired confidence level. In some embodiments, the confidence level can be user-configurable or predetermined.

Different approaches may be utilized to select a total number of documents from each of the batches. In some embodiments, the content server may select documents from each of the batches by randomly sampling the documents within each of the batches. In some embodiments, the content server may select documents from each of the batches by randomly eliminating documents within each of the batches and selecting non-eliminated documents.

The content server may implement one or more of these approaches. For example, the content server may compare the total of documents and the batch size and determine an appropriate selection process. If the total of documents is less than a threshold relative to the batch size, the content server may proceed to randomly sample documents within each of the batches such that the total of documents is selected from each of the batches. If the total of documents meets or exceeds a threshold relative to the batch size, the content server may proceed to randomly eliminate documents within each of the batches such that the total of documents is selected from each of the batches.

In some embodiments, the content server may sort the documents prior to dividing the collection of documents. In some embodiments, the batch size is a maximum batch size and the batch size is an equal or approximately equal number of documents in each batch less than the maximum batch size.

In some embodiments, the method may further comprise sending a representation of the set of selected documents in the disk image to the user device; receiving a confirmation of the disk image from the user device; and generating a full disk image of the collection of documents stored in the repository.

One embodiment comprises a system comprising at least one processor and a non-transitory computer-readable storage medium that stores computer instructions translatable by the at least one processor to perform a method substantially as described herein. Another embodiment comprises a computer program product having at least one non-transitory computer-readable storage medium that stores computer instructions translatable by at least one processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration, and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the disclosure in detail. It should be understood, however, that the detailed description and the specific examples, while indicating some embodiments, are given by way of illustration only and not by way of limitation. Various substitutions, modifications, additions and/or rearrangements within the spirit and/or scope of the underlying inventive concept will become apparent to those skilled in the art from this disclosure.

Figure 1:
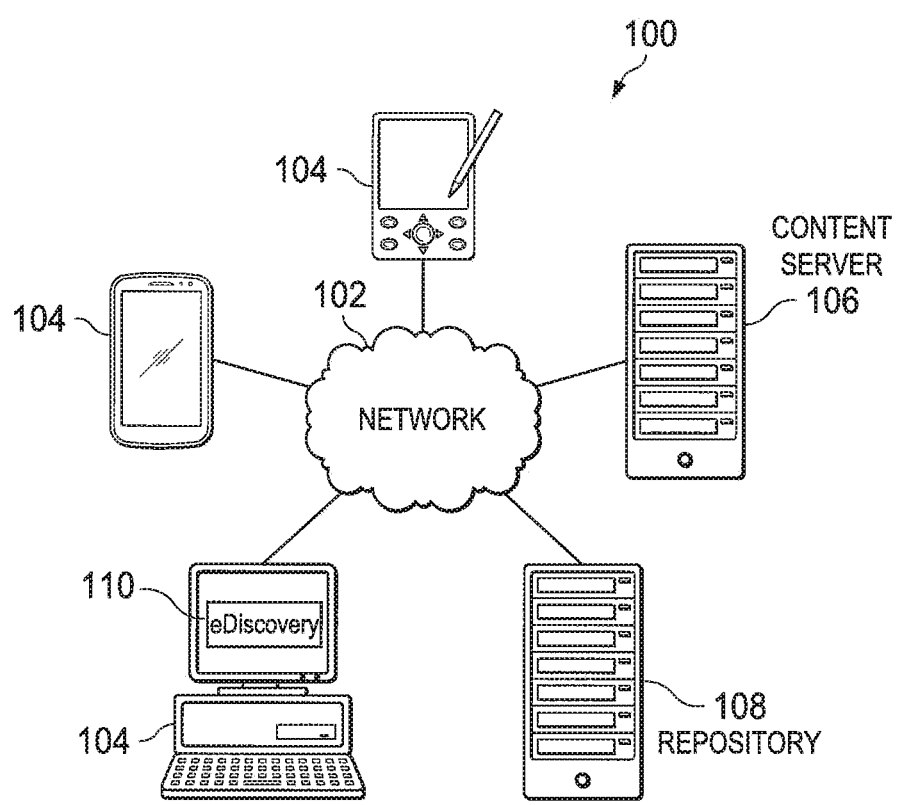
FIG. 1 depicts a diagrammatic representation of an example of a network system including a content server where embodiments disclosed herein may be implemented.

FIG. 1 schematically depicts exemplary computer network environment 100 for implementing embodiments of the invention. As illustrated, network environment 100 may include client computing devices 104 which communicate through network 102 with content server 106. While three client computing devices 104 are illustrated in the example of FIG. 1, any number of client computers may be in use. Client computing devices 104 may be geographically distributed across network 102, collocated, or any combination thereof. Likewise, while a single content server 106 is illustrated in this example, it should be appreciated that the functionality of content server 106 may be distributed over multiple servers which may be clustered, geographically distributed across network 102, or any combination thereof.

In a typical e-discovery process, a user may utilize eDiscovery tool 110 to search a custodian's data store (e.g., repository 108) for data that match certain criteria (e.g., keywords, date ranges, custodian information, sender information, etc.). The custodian may have a reason, such as a legal obligation, to make data available to third parties, such as attorneys, courts, or service bureaus. While eDiscovery tool 110 may be programmed to communicate with content server 106, this is an inefficient and ineffective process which provides the user with little control over the quality of the data thus discovered.

With embodiments disclosed herein, the need to use eDiscovery tool 110 is eliminated. Instead, client computing devices 104 can communicate with content server 106 through network 102 to request a disk image be generated by content server 106.

Content server 106 may be configured with an electronic discovery capability, including the ability to perform a "make disk image operation." The "make disk image operation" may entail content server 106 responding to a request from client computing device 104 to generate a disk image for particular content collected from one or more data repositories 108. Repositories 108 may be under management by content server 106. To this end, data objects such as documents residing on repositories 108 may be referred to as managed objects as they are managed by content serer 106. In some embodiments, the request from client computing device 104 may include at least one of a batch number, a number of documents per batch, a desired confidence level, or a total number of documents to be produced. As further explained below, content server 106 may process documents in a document collection on a batch-by-batch basis in an efficient and cost-effective manner.

Client computing devices 104 may act as terminals, hypertext browser clients, graphical display clients, or other networked clients to content server 106. For example, a web browser application at client computing devices 104 may support interfacing with a web server application at content server 106. Such a browser may use controls, plug-ins, or applets to support interfacing to content server 106. Client computing devices 104 can also use other customized programs, applications, or modules to interface with content server 106. Client computing devices 104 can be desktop computers, laptops, handhelds, mobile devices, mobile telephones, television set-top boxes, kiosks, servers, terminals, thin-clients, or any other computerized devices.

Network 102 may be any communications network capable of supporting communications between client computing devices 104 and content server 106. Network 102 may be wired, wireless, optical, radio, packet switched, circuit switched, or any combination thereof. Network 102 may use any topology, and links of network 102 may support any networking technology, protocol, or bandwidth such as Ethernet, DSL (Digital Subscriber Line), cable modem, ATM (Asynchronous Transfer Mode), SONET (Synchronous Optical Network), MPLS (Multiprotocol Label Switching), PSTN (Public Switched Telephone Network), POTS (Plain Old Telephone Service) modem, PONS (Passive Optical Networks), HFC Networks (Hybrid Fibre Coaxial Networks), satellite, ISDN (Integrated Services for Digital Network), WFi, WMax, mobile cellular, any combination thereof, or any other data interconnection or networking mechanism. Network 102 may be an intranet, the Internet (or the World Wide Web), a LAN (Local Area Network), WAN (Wide Area Network), MAN (Metropolitan Area Network), or any other network for interconnecting computers. To support high volume and load, a distributed computing environment may be implemented by using networking technologies that may include, but are not limited to, TCP/IP (Transmission Control Protocol/Internet Protocol), RPC (Remote Procedure Call), Java RMI (Java Remote Method Invocation), HTTP (Hypertext Transfer Protocol), Web Services (Extensible Markup Language (XML)-RPC, Java Application Programming Interface (API) for XML-based RPC (JAX-RPC), simple Object Access Protocol (SOAP), etc.).

It should be appreciated that, in addition to the illustrated network environment, content server 106 and client computer 110 may be combined into a single computing device. Such a combined computing device can support search indexes stored locally or remotely.

Figure 2:
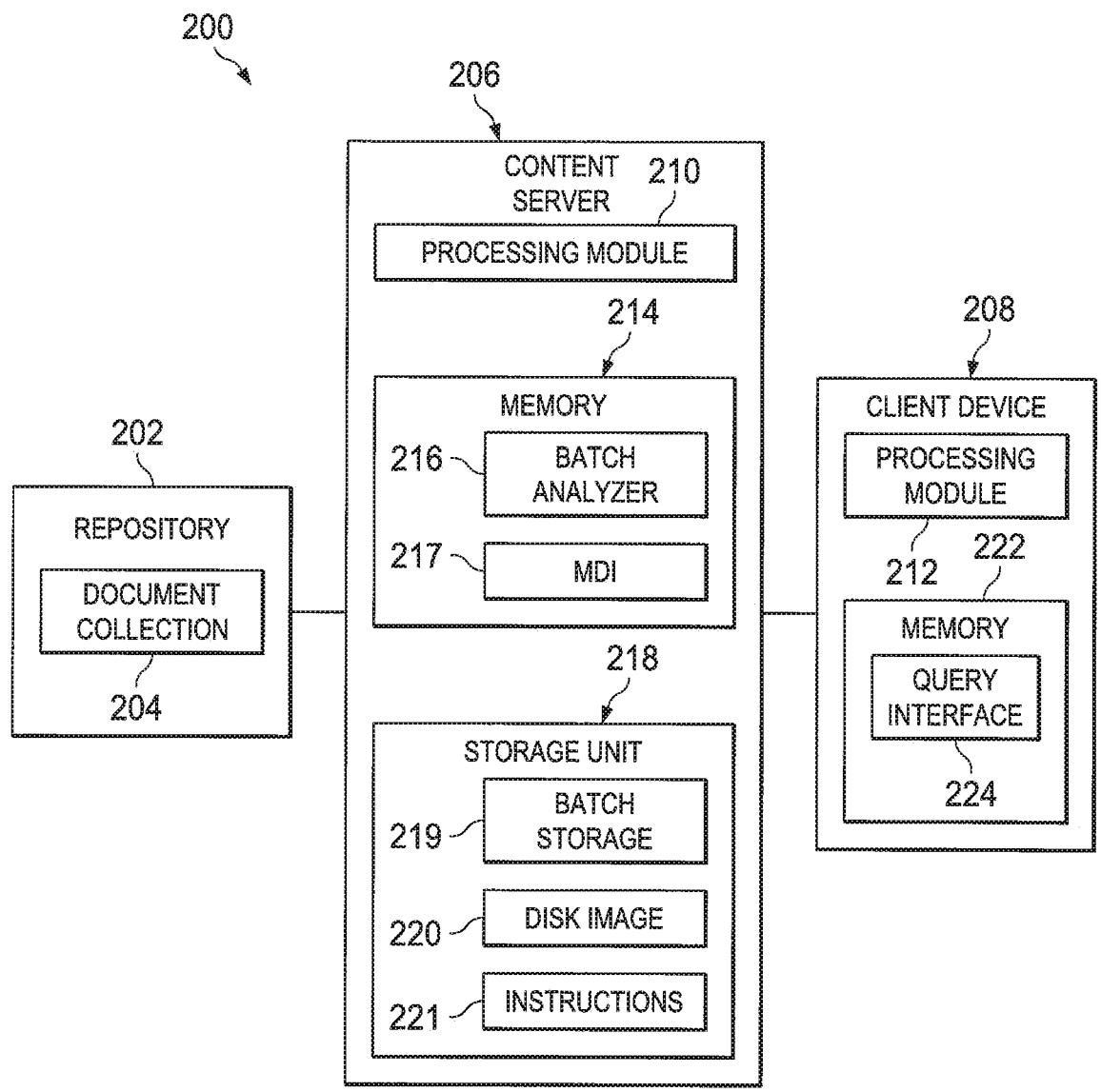
FIG. 2 depicts a diagrammatic representation of an example of a content server with built-in electronic discovery functionality according to some embodiments disclosed herein.

FIG. 2 is a block diagram illustrating one embodiment of computing environment 200 implementing a Make Disk Image function in accordance with embodiments. Computing environment 200 may include object repository 202 storing a document collection including objects of interest (e.g., documents, images, emails or other objects). Object repository 202 may comprise a file server or database system or other storage mechanism remotely or locally accessible by content server 206. In some embodiments, the objects of interest are not copied or moved to a different location within repository 202. For example, objects matching search criteria may be identified and added to an index or list, with the objects remaining in place in repository 202.

In the example illustrated in FIG. 2, content server 206 may include a server machine having processor or processing module 210 connected to non-transitory computer memory 214 and storage unit 218 via a bus. Processing module 210 may represent a single processor, multiple processors, a processor(s) with multiple processing cores, or the like. Storage unit 218 may include a non-transitory storage medium such as hard disk drives, flash memory devices, optical media, or the like. Content server 206 may be connected to a data communications network (e.g., network 102 of FIG. 1).

Storage unit 218 may include batch store 219 configured for storing batches retrieved from repository 202 (or indices of batches) and may further store disk image(s) 220 created using Make Disk Image (MDI) function 217 embodied on memory 214. In addition, storage unit 218 may store instructions 221 translatable by processing module 210. Instructions 221 can represent multiple programs and operating system code. In some embodiments, when translated by processing module 210, instructions 221 may operate to provide batch analyzer 216 and MDI 217. In some embodiments, batch analyzer 216 and MDI 217 may be implemented as a single software module embodied on non-transitory computer memory 214.

Client device 208 may include hardware components similar to those of the server of content server 206, such as processing module 212 and non-transitory computer memory 222. Memory 222 may embody instructions translatable by processing module 212 to provide user or query interface 224 of content server 206. Query interface 224 may be particularly configured for allowing a user to query content server 206 in an electronic discovery workflow. In some embodiments, query interface 224 may be configured with a function that allows a user to create and send a Make Disk Image request, including parameters for use in an e-discovery workflow, from client device 208 to content server 206. In some embodiments, query interface 224 may be implemented through a web browser, file system interface, or other program. Content server 206 may receive the Make Disk Image request (e.g., via MDI 217), run batch analyzer 216 to process document collection 204 stored in repository 202, and return a sample of documents to client device 208 for presentation on query interface 224. This is further explained below.

Content server 206 shown in FIG. 2 is an example of a data processing system where an embodiment disclosed herein may be implemented. Embodiments may be implemented on other types of data processing/computing systems (e.g., desktop computers, laptops, mobile computing devices or other computing devices with adequate processing and memory), including multiple computers acting together to provide a search system (e.g., a cluster of servers or other computing devices connected by a network acting together to provide the search system). Similarly, client device 208 may include any suitable desktop computer, laptop, mobile device, server or other computing system.

In operation, query interface 224 can be used to request content server 206 to search document collection 204 stored in repository 202 for documents that match certain search criteria (e.g., documents containing certain keywords, documents having particular metadata such as a custodian identifier, etc.) pertaining to a matter or topic associated with an electronic discovery workflow, and return them into corresponding collection 204. Query interface 224 may further be configured for allowing a user to set one or more parameters for processing the collected documents (or objects) in batches. Example parameters may include a batch size, a number of documents desired returned, a confidence level desired, etc. In response, batch analyzer 216 may batch processes document collection 204 to produce the corresponding number of documents. The output from batch analyzer 216 can be communicated to MDI 217 for automatic generation of a disk image containing the number of documents. The output from MDI 217 (a disk image) can then be stored in disk image store 220 and/or communicated to client device 208 (e.g., via MDI 217 and query interface 224). Alternatively, the output from batch analyzer 216 can be communicated to client device 208 via MDI 217 and query interface 224 for user review. Responsive to an indication from a user (e.g., via query interface 224), MDI 217 may generate a disk image containing the number of documents. The disk image thus generated and then stored in disk image store 220 and/or communicated to client device 208 (e.g., via MDI 217 and query interface 224).

Operation of embodiments may be further illustrated by way of examples. Suppose, for example, that a document collection for which a disk image is to be obtained includes 1,000,000 documents, a batch size of 10,000 is specified, and a total number of documents to be returned is defined as 7,000 (e.g., by a user via query interface 224). In this case, content server 206 may determine that there are 100 batches, each having a batch size of 10,000 documents, operate to examine each of the 100 batches, and randomly return 70 documents from each batch to produce a total of 7,000 documents. In some embodiments, the documents may be sorted before the batches are determined. For example, they may be sorted by name, date, or other criteria. Sorting prior to batching may have a technical effect that the documents in a batch may be more homogenous (e.g., the 10,000 documents in each batch may be more similar to each other than not). Alternatively or additionally, documents may be sorted (e.g., using the same or different criteria) subsequent to batching and prior to random selection (or deselection). This may have a technical effect that the overall result thus produced (e.g., the 7,000 total number of documents returned) more accurately represents the document collection (e.g., the 1,000,000 documents in the example document collection).

If, given the total number of documents specified, the batch size and/or the size of the sample set desired are not evenly divisible, an additional batch handling routine may be invoked to ensure that the batches are, to the extent possible, of equivalent size. In some embodiments, a batch handling routine may divide a sample set such that there is a maximum batch size, and each batch having a size that is less than the maximum batch size may contain an equal or approximately equal number of documents that is less than the maximum batch size and that still meets a specified batch size. For example, if a document collection for which a disk image is to be obtained contains 50,003 documents, and a batch size of 1,000 documents is specified, a batch handling routine may divide the documents in the collection into one batch of 1,003 documents (which represents the maximum batch size) and four batches of 1,000 documents such that all four batches have an equal or approximately equal number of documents that is less than the maximum batch size and that is at least the specified batch size.

In some cases, it may be desirable to process in smaller batches. In some embodiments, a maximum batch size is specifically assigned (e.g., 10,000 documents). The maximum batch size may be assigned independent of the divisibility of the total number of documents specified relative to the batch size and/or the size of the sample set desired. In some embodiments, the maximum batch size may be specified/configurable by the user (e.g., via query interface 224).

In some embodiments, performance may be improved through a deselection or elimination process, rather than a selection process. For example, if the number of documents desired returned is larger than a threshold (e.g., 50% of the documents in the batch), then it may require less processing time to randomly deselect documents than to select them. That is, the content server may determine which documents should be removed from the batch and then store the remaining ones for the disk image. Similarly, if the number is smaller than the threshold, it may be desirable to randomly select the documents, i.e., choose the ones that should be returned.

The determination of how many documents from a document collection should be returned may be accomplished in a variety of ways. Broadly speaking, a total number of documents desired from a document collection may be heuristically chosen by a user. In some embodiments, a content server may perform one or more statistical analyses and recommend to a user a value for the total number of documents from a document collection that should be returned.

For example, the total number of documents from a document collection that should be returned may depend upon a confidence level desired. In this case, the confidence level refers to the probability that the total number of documents selected from a document collection actually represents the entire document collection. Skilled artisans appreciate that, generally, the higher the level of confidence is desired, the larger the disk image relative to the document collection would be. To this end, content server 206 may include a statistical analyzer particularly configured for performing one or more statistical analyses responsive to a request to make a disk image of a document collection. Content server 206 may present results and/or make a recommendation as to the total number of documents from the document collection that should be returned. For example, responsive to a request to make a disk image of a document collection of 1,000,000 documents, content server 206 may operate to perform statistical analyses and present selectable options to a user via query interface 224 (e.g., "Make a Disk Image of 4,089 documents with ±1% of margin of error and 80% confidence level"; "Make a Disk Image of 9,512 documents with ±1% of margin of error and 95% confidence level"; "Make a Disk Image of 2,184 documents with ±3% of margin of error and 99.5% confidence level"; etc.). As a non-limiting example, content server 206 may recommend, as a default setting, the total number of documents to be selected from a document collection with ±1% of margin of error and 95% confidence level, for instance.

In some embodiments, content server 206 may include a size calculator that allows a user to specify, via query interface 224, values for an acceptable margin of error and a desired confidence level, operates to calculate the appropriate size for the disk image based on the user-specified parameter values, and returns the calculated size to the user via query interface 224. The user may instruct content server 206 to use the calculated size as the total number of documents to be selected from the document collection or may choose to enter different values into the size calculator and get a different total number of documents to be selected from the document collection. The necessary programming techniques necessary to implement such a size calculator are known to those skilled in the art.

Figure 3:
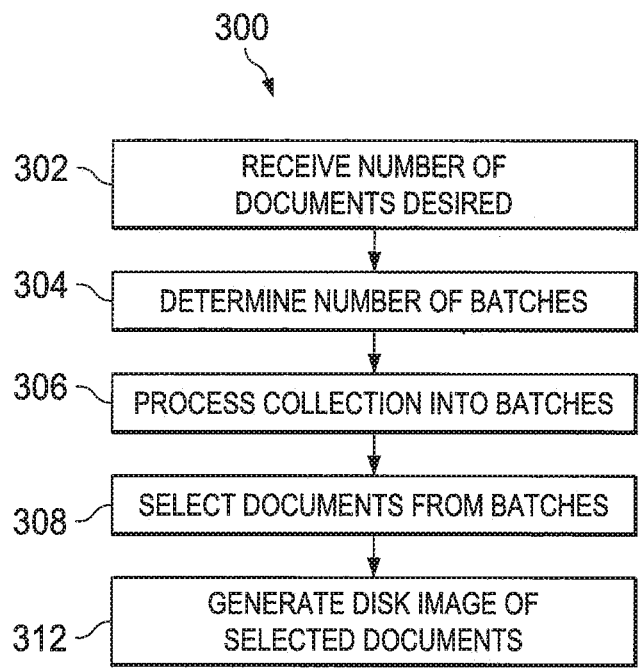
FIG. 3 depicts a flow diagram illustrating an example of a method for generating a disk image according to some embodiments disclosed herein.

Operation of embodiments is more particularly shown in process flow 300 of FIG. 3 which, in some embodiments, may be implemented by content server 206 described above with reference to FIG. 2. In some embodiments, MDI 217 of content server 206 may receive from query interface 224 a request from a user to generate a disk image from a document collection. The request may include a total number of documents desired from the document collection (step 302). As described above, the total number of documents may be specified by the user or determined by content server 206.

Batch analyzer 216 may determine a number of batches based on the total number of documents to be selected from the document collection (step 304). The number of batches may be determined based on a batch size. As described above, the batch size may be specified by the user or based on a predetermined batch size setting at content server 206. In some embodiments, the number of batches is determined based on the number of documents in the entire document collection divided by the batch size.

In some embodiments, batch analyzer 216 may determine an appropriate batch size and/or the number of batches based on, for example, the processing capacity or bandwidth capacity of content server 206, repository 108, and/or network 102 and determine/adjust the number of batches or batch size to optimize processing performance. In some embodiments, batch analyzer 216 may determine an appropriate batch size and/or the number of batches based on, for example, a user-specified confidence level as described above. In some embodiments, batch analyzer 216 may operate to examine the documents in the document collection and ensure that the document collection is broken into batches such that each batch is of a size that the desired confidence level can be achieved for each batch. In some embodiments, batch analyzer 216 may select the batch size and/or number of batches to ensure that, to the extent possible, the batches are of uniform size. For example, if a document collection contains 903 documents and a batch size of 300 is specified, the batch size may be rounded up (or down, depending upon a configurable setting) such that the document collection is broken into three batches of 301 documents each, rather than three batches of 300 documents and one batch of only 3 documents. In some embodiments, prior to being divided into batches, documents in a document collection may be sorted according to one or more properties or attributes, such as date, author's name or subject. Embodiments may implement one or more batch sizing techniques to ensure that a disk image thus produced can provide a statistically relevant representative sampling of all the original documents in the document collection. Once the total number of documents to be selected from the document collection and the batch size are determined, the document collection may be divided into batches (step 306).

At this time, processing is performed at the batch level. Specifically, a number of documents may be selected (or deselected) from each batch (step 308). In some embodiments, the number of documents may be selected from each batch randomly. Various random sampling methods known to those skilled in the art may be utilized. For example, each of the documents in a batch may be associated with an index number, and content server 206 may use a known statistical method to randomly select documents according to randomly selected index numbers.

A disk image of the selected documents may be created leveraging disk image generation technologies known to those skilled in the art (step 312). For example, MDI 217 of content server 206 may include a hardware- or software-based write blocker that allows data to be acquired from a drive, file, folder, etc. without creating the possibility of accidentally damaging the contents. Write blockers are particularly programmed to allow read commands to pass, but block write commands, to thereby protect the contents from being changed or damaged. However, unlike some conventional e-discovery tools, which may produce a "forensic," "mirror" or "physical" image as an exact copy of a storage device and/or which may require replication of all of its data bit for bit, including all active files and the remnants of "deleted" files, the disk image thus generated by MDI 217 may include only the documents particularly selected from the document collection.

In some embodiments, prior to generation of a disk image, the selected documents can be copied into a folder, container, or drive on content server 206. In some embodiments, the selected documents are not copied. Rather, a list of database object IDs corresponding to the selected documents is generated for future export and/or generation of a disk image.

Figure 4:
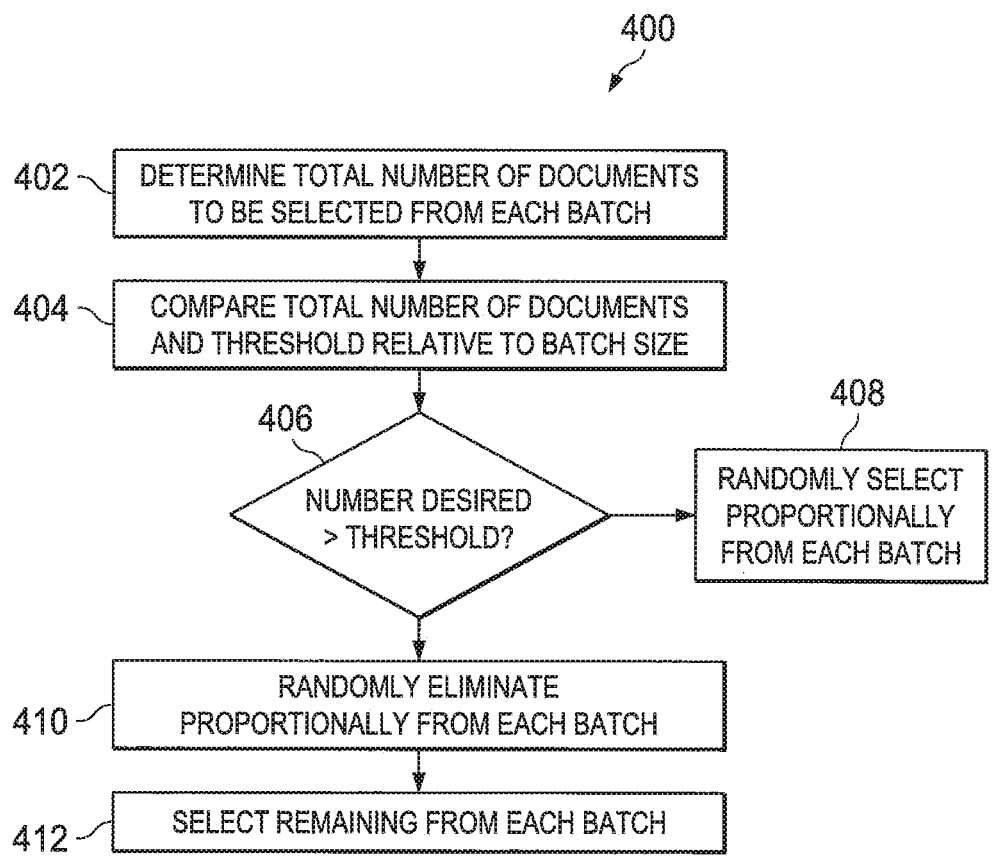
FIG. 4 depicts a flow diagram illustrating an example of a method for determining an efficient document selection approach according to some embodiments disclosed herein.

FIG. 4 depicts a flow diagram illustrating an example of method 400 for determining, by batch analyzer 216, an efficient document selection approach according to some embodiments. Initially, batch analyzer 216 may determine a total number of documents to be selected from each batch (step 402). As described above, this may include dividing the number of documents desired by the number of batches which, in turn, can be determined by dividing the number of documents by the batch size. As also discussed above, the batch size and/or number of batches may be adjusted such that the batches are uniform in size.

The number of documents to be selected from each batch is compared to a predetermined threshold relating to the batch size (step 404). For example, the predetermined threshold can be a percentage or ratio of the batch size. If the number of documents to be selected from each batch is greater than the predetermined threshold (step 406), then documents are randomly deselected or eliminated from each batch (step 410). In this case, the number of documents deselected from each batch may equal or approximately equal to the batch size minus the number of documents desired from each batch. The remaining documents are selected for generation of a disk image (step 412). If, at step 406, the number desired from each batch is less than the threshold, then the number of documents in each batch would be randomly selected (step 408) and used to generate the disk image. For example, if a batch size is 10,000 documents (i.e., there are 10,000 documents in each batch) and a predetermined threshold value is 50%, then in cases where more than 5,000 documents are to be selected from each batch, batch analyzer 216 will proceed with the document deselection approach (steps 410-412) as it is more efficient than the document selection approach (step 408). If, however, less than 5,000 documents are to be collected from each batch, batch analyzer 216 will proceed with the document selection approach (step 408) as it is more efficient than the document deselection approach (steps 410-412).

By way of an illustrative example, control logic for implementing an embodiment disclosed herein may include the following code:

```
Sample Set Logic:
    function Simplified_SampleSetLogic( )
        Integer index
        List indexes
        Integer batchSampleSize
        Boolean exclude = FALSE
        RecArray selectedRecs = RecArray.Create(
RecArray.FieldNames( .fRecs ) )
        Real total = .GetSize( )
        Integer currentSampleSize = .fStatSubsetCount
            Integer maxSampleSize = Math.Min( .fConfig.sampleSize,
total )
        if ( maxSampleSize == UNDEFINED )
            // End process. User has not asked for a
sample set. We are done!
        elseif ( currentSampleSize >= maxSampleSize )
            // End process. Sample set is already
been met or exceeded. We are done!
            .fStatSubsetDone = TRUE
        else
            // Calculate how many
records/items/objects should be selected from this batch
(chunk) for the sample set
            // Use pre-filtered size to determine the
ideal, appropriate proportion of samples for this batch.
            // .fSizeOfRecsPre == Length( .fRecs )
            batchSampleSize = Math.Round(
.fSizeOfRecsPre/total*maxSampleSize )
                if ( batchSampleSize > Length( .fRecs ) )
                    // Do not modify .fRecs. Use all
objects in this batch.
                elseif ( batchSampleSize == Length(
.fRecs ) )
                    // Do not modify .fRecs sample
quota met.
                else
                    // Optimization: Identify the
efficiency threshold relative to random selection option
(using an API) records for EXCLUSION.
                    // rather than INCLUSION.
                    if ( batchSampleSize/Length( .fRecs
```

-continued

```
                    ) > 0.5 E.T. )
                        exclude = TRUE
                    end
                    if ( exclude )
                        selectedRecs =
RecArray.Copy( .fRecs )
                        // Randomly select records
for exclusion using the ever shrinking selectedRecs
                        while ( Length( selectedRecs
) > batchSampleSize )
                            index = Math.Random(
Length( selectedRecs ) ) + 1 // Math.Random is 0-based
                            RecArray.DropRecord(
selectedRecs, index )
                        end
                    else
                        // Randomly select records
for inclusion
                        while ( Length( selectedRecs
) < batchSampleSize )
                            index = Math.Random(
Length( .fRecs ) ) + 1 // Math.Random is 0-based
                            if ( ( index in
indexes ) == 0 )
                                RecArray.AddRecord
( selectedRecs, RecArray.GetRecord( .fRecs[ index ] )   )
                                indexes =
{@indexes, index}
                            end
                        end
                    end
                    // set .fRecs to be the randomly
selected subset
                    .fRecs = selectedRecs
                end
            end
        end
```

Figure 5:
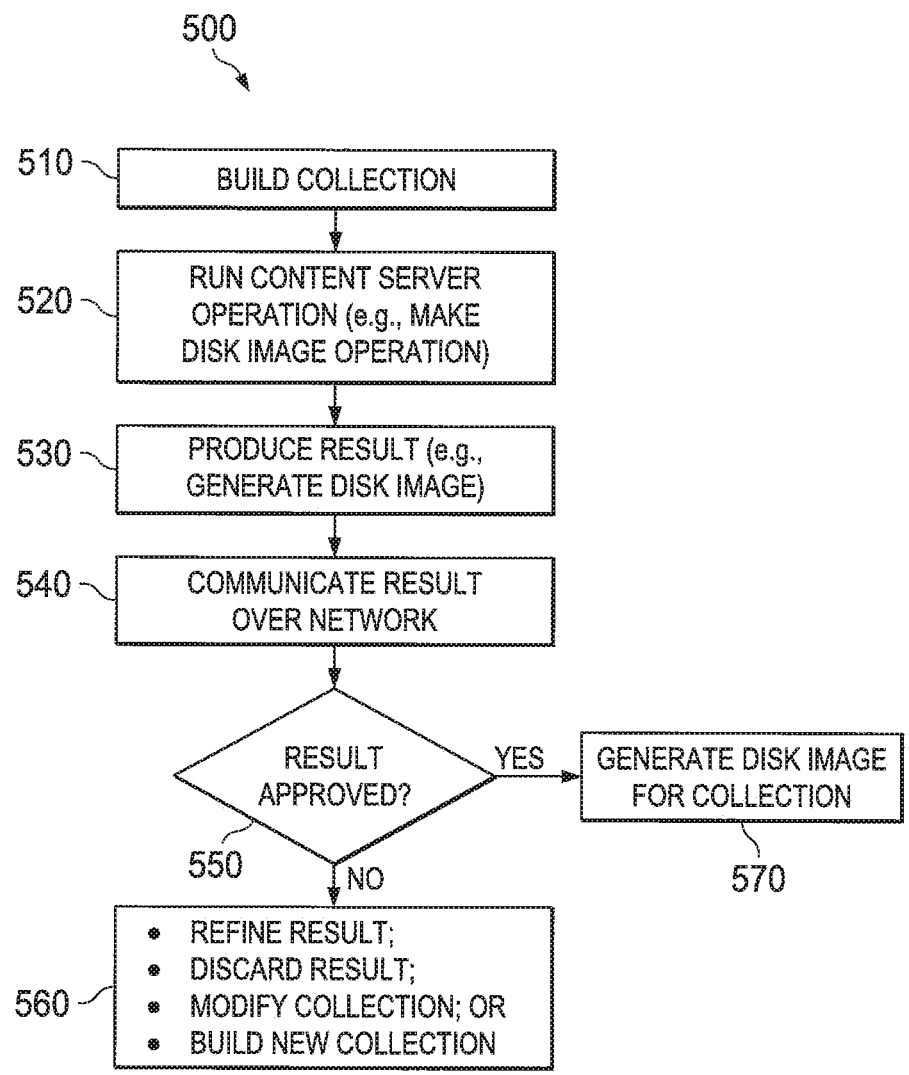
FIG. 5 depicts a flow diagram illustrating an example of an e-discovery workflow according to some embodiments disclosed herein.

Embodiments described above may be implemented as part of an e-discovery workflow. FIG. 5 depicts a flow diagram illustrating an example of an e-discovery workflow according to some embodiments disclosed herein.

In the example of FIG. 5, e-discovery workflow 500 may include building a document collection (step 510). This may entail conducting a search of a repository or repositories (e.g., repository 108 shown in FIG. 1 or repository 202 shown in FIG. 2) and identify documents that match certain search criteria as being in the document collection. Such a document collection may be built in various ways. For example, as discussed above, documents may be copied into a designated container such as a file, a folder, a file system, a drive, a data storage device, etc. As another example, a list or database may be generated to reference documents in a document collection without moving or copying the documents.

Independent of how a document collection is built (and/or by whom), a user may indicate to a content server implementing an embodiment disclosed herein (e.g., content server 106 of FIG. 1 or content server 206 of FIG. 2) to run a content server operation that implements an embodiment of process flow 300 (and, in some embodiments, method 400 for determining an efficient document selection approach) (step 520). As described above, this may entail processing documents in the document collection into batches and selecting documents from each batch for generation of a disk image.

Documents thus selected from each batch are considered representative of the entire document collection and meet the total number of documents specified by the user or determined by the system. At this time, the selected documents may be further processed (step 530). In some embodiments, this may entail making a disk image (e.g., via MDI 217 of content server 206 described above) that includes the total number of documents. In some embodiments, this step may be optional (e.g., when a disk image is not required at this stage of e-discovery workflow 500).

The result or output from step 520 or 530 is communicated over a network to a user device (e.g., client computing device 104 shown in FIG. 1) associated with the requesting user (step 540). In some embodiments, this may entail communicating actual documents outputted from step 520. In some embodiments, this may entail communicating a disk image generated at step 530. In some embodiments, this may entail communicating a representation of the disk image (for example, the text components of the documents, or an index by which the selected documents may be found) in lieu of the actual documents.

A decision is made at step 550 as to whether the document collection from step 510 is approved to proceed. This decision can be based on whether the result communicated from e-discovery workflow 500, which represents the entire document collection, is considered relevant for the particular purpose of e-discovery workflow 500 or otherwise support commitment of resources to make and produce a disk image of the entire document collection built at step 510 which, as skilled artisans can appreciate, can encompass a significant and enormous amount of data. If so, e-discovery workflow 500 may proceed to step 570 to generate a disk image that includes a copy of the entire document collection. Otherwise, e-discovery workflow 500 may proceed to step 560 and take an appropriate next action. Examples of possible next actions may include refining the result, for instance, by returning to step 520 and run it again with different parameters (e.g., returning more or less documents from the document collection, or changing a confidence level, etc.). Alternatively, the user may opt to discard the result altogether and start over again with a modified document collection or a new document collection.

Figure 6:
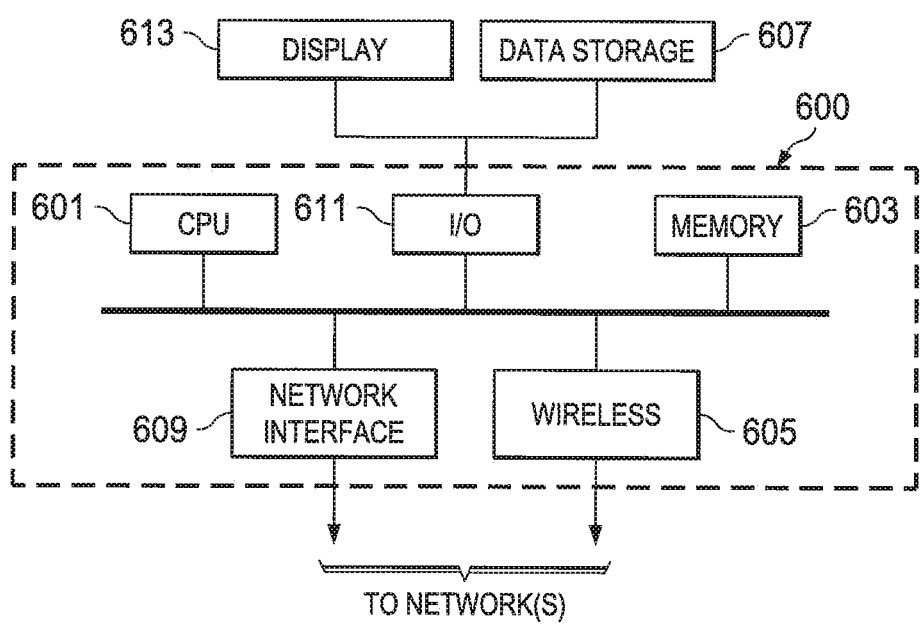
FIG. 6 depicts a diagrammatic representation of a data processing system for implementing some embodiments disclosed herein.

FIG. 6 depicts a diagrammatic representation of an example data processing device that may be used to implement a client computing device or a content server in accordance with embodiments. As shown, data processing system 600 may include one or more central processing units (CPU) or processors 601 coupled to one or more user input/output (I/O) devices 611 and memory devices 603. Examples of I/O devices 611 may include, but are not limited to, keyboards, displays, monitors, touch screens, printers, electronic pointing devices such as mice, trackballs, styluses, touch pads, or the like. Examples of memory devices 603 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 600 can be coupled to display 613, information device 607 and various peripheral devices (not shown), such as printers, plotters, speakers, etc. through I/O devices 611. Data processing system 600 may also be coupled to external computers or other devices through network interface 609, wireless transceiver 605, or other means that is coupled to a network such as a LAN, WAN, or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one ROM, at least one RAM, at least one HD, and one or more I/O device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

As used herein, the term "document" refers broadly to any data, including managed content objects. Example documents may include, without limitation, spreadsheets, source code, electronic slideshows, digital images, word processor documents, text files, digital videos, digital audio recordings, e-mails, digital calendar entries, etc.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
   receiving, by a server computer from a user device, a request to generate a disk image from a collection of documents stored in a repository;
   determining, by the server computer, a quantity of documents for generating a disk image from the collection of documents stored in the repository;
   determining, by the server computer based on a confidence level and in view of the quantity of documents to be selected from the collection of documents stored in the repository, at least a batch size or a number of batches for processing the collection of documents stored in the repository, the confidence level relating to a probability that the quantity of documents selected from the collection of documents stored in the repository represents the collection of documents;
   processing, by the server computer, the collection of documents into batches utilizing at least the batch size or the number of batches determined by the server computer such that the confidence level is achieved for each batch;
   selecting or deselecting, by the server computer, documents from each batch to form a set of documents, the set of documents not less than the quantity of documents determined by the server computer; and
   communicating, by the server computer, the set of documents to the user device over a network.

2. The method according to claim 1, further comprising:
   copying, by the server computer, the set of documents from the repository into a file, folder, container, file system, drive, or data storage device on the server computer.

3. The method according to claim 1, further comprising:
   generating a list of object identifiers corresponding to the set of documents.

4. The method according to claim 3, further comprising:
   exporting the set of documents utilizing the list of object identifiers; or
   generating the disk image utilizing the list of object identifiers.

5. The method according to claim 1, wherein the determining further comprises rounding up or down the batch size such that the batches having a uniform or approximately uniform size.

6. The method according to claim 1, wherein the number of batches is determined by the server computer to ensure that the batches are of a uniform or approximately uniform size.

7. The method according to claim 1, wherein the selecting or deselecting is performed by the server computer utilizing a random sampling method.

8. A system, comprising:
   a processor;
   a non-transitory computer-readable medium; and
   stored instructions translatable by the processor for performing:
      receiving, from a user device, a request to generate a disk image from a collection of documents stored in a repository;
      determining a quantity of documents for generating a disk image from the collection of documents stored in the repository;
      determining, based on a confidence level and in view of the quantity of documents to be selected from the collection of documents stored in the repository, at least a batch size or a number of batches for processing the collection of documents stored in the repository, the confidence level relating to a probability that the quantity of documents selected from the collection of documents stored in the repository represents the collection of documents;
      processing the collection of documents into batches utilizing at least the batch size or the number of batches determined by the server computer such that the confidence level is achieved for each batch;
      selecting or deselecting documents from each batch to form a set of documents, the set of documents not less than the quantity of documents; and
      communicating the set of documents to the user device over a network.

9. The system of claim 8, wherein the stored instructions are further translatable by the processor for performing:
   copying the set of documents from the repository into a file, folder, container, file system, drive, or data storage device.

10. The system of claim 8, wherein the stored instructions are further translatable by the processor for performing:
    generating a list of object identifiers corresponding to the set of documents.

11. The system of claim 10, wherein the stored instructions are further translatable by the processor for performing:
    exporting the set of documents utilizing the list of object identifiers; or
    generating the disk image utilizing the list of object identifiers.

12. The system of claim 8, wherein the determining further comprises rounding up or down the batch size such that the batches having a uniform or approximately uniform size.

13. The system of claim 8, wherein the number of batches is determined to ensure that the batches are of a uniform or approximately uniform size.

14. The system of claim 8, wherein the selecting or deselecting is performed utilizing a random sampling method.

15. A computer program product comprising a non-transitory computer-readable medium storing instructions translatable by a processor for:
 receiving, from a user device, a request to generate a disk image from a collection of documents stored in a repository;
 determining a quantity of documents for generating a disk image from the collection of documents stored in the repository;
 determining, based on a confidence level and in view of the quantity of documents to be selected from the collection of documents stored in the repository, at least a batch size or a number of batches for processing the collection of documents stored in the repository, the confidence level relating to a probability that the quantity of documents selected from the collection of documents stored in the repository represents the collection of documents;
 processing the collection of documents into batches utilizing at least the batch size or the number of batches determined by the server computer such that the confidence level is achieved for each batch;
 selecting or deselecting documents from each batch to form a set of documents, the set of documents not less than the quantity of documents; and
 communicating the set of documents to the user device over a network.

16. The computer program product of claim 15, wherein the instructions are further translatable by the processor for:
 copying the set of documents from the repository into a file, folder, container, file system, drive, or data storage device.

17. The computer program product of claim 15, wherein the instructions are further translatable by the processor for:
 generating a list of object identifiers corresponding to the set of documents.

18. The computer program product of claim 17, wherein the instructions are further translatable by the processor for:
 exporting the set of documents utilizing the list of object identifiers; or
 generating the disk image utilizing the list of object identifiers.

19. The computer program product of claim 15, wherein the determining further comprises rounding up or down the batch size such that the batches having a uniform or approximately uniform size.

20. The computer program product of claim 15, wherein the number of batches is determined to ensure that the batches are of a uniform or approximately uniform size.

\* \* \* \* \*